United States Patent
Chen et al.

(10) Patent No.: US 12,118,487 B2
(45) Date of Patent: Oct. 15, 2024

(54) DIFFERENCES IN HIERARCHICAL LEVELS OF INFORMATION TECHNOLOGY WORKFLOWS

(71) Applicant: ENTIT SOFTWARE LLC, Sanford, NC (US)

(72) Inventors: Rotem Chen, Yehud (IL); Hava Babay Adi, Yehud (IL); Shlomi Chovel, Yehud (IL); Olga Tubman, Yehud (IL); Ran Biron, Yehud (IL)

(73) Assignee: Micro Focus LLC, Santa Clara, CA (US)

( * ) Notice: Subject to any disclaimer, the term of this patent is extended or adjusted under 35 U.S.C. 154(b) by 689 days.

(21) Appl. No.: 16/079,752

(22) PCT Filed: Feb. 26, 2016

(86) PCT No.: PCT/US2016/019831
§ 371 (c)(1),
(2) Date: Aug. 24, 2018

(87) PCT Pub. No.: WO2017/146731
PCT Pub. Date: Aug. 31, 2017

(65) Prior Publication Data
US 2019/0050776 A1    Feb. 14, 2019

(51) Int. Cl.
  G06Q 10/0633    (2023.01)
  G06Q 10/0631    (2023.01)
  G06Q 10/10      (2023.01)

(52) U.S. Cl.
  CPC ... *G06Q 10/06316* (2013.01); *G06Q 10/0633* (2013.01); *G06Q 10/103* (2013.01)

(58) Field of Classification Search
  CPC .................................................. G06Q 10/0633
  See application file for complete search history.

(56) References Cited

U.S. PATENT DOCUMENTS

| 8,881,160 | B2 | 11/2014 | Ozaki et al. | |
| 2007/0288890 | A1* | 12/2007 | Wells | G06F 8/38 717/113 |
| 2008/0243524 | A1 | 10/2008 | Agrawal et al. | |
| 2009/0119319 | A1* | 5/2009 | Li | G06F 16/213 |

(Continued)

FOREIGN PATENT DOCUMENTS

| JP | 2012168950 B2 | 9/2012 | |
| WO | WO-2014028303 A1 * | 2/2014 | G06Q 10/06 |

OTHER PUBLICATIONS

Ralph Bergmann and Yolanda Gil, "Similarity assessment and efficient retrieval of semantic workflows," 2014, Information Systems journal, vol. 20, pp. 115-127 (Year: 2014).*

(Continued)

*Primary Examiner* — Amanda Gurski
(74) *Attorney, Agent, or Firm* — Sheridan Ross P.C.

(57) ABSTRACT

In some examples, a first difference may be determined across respective first and second workflow elements in a first hierarchical level of respective first and second IT workflow data. A second difference may be determined across respective third and fourth workflow elements in a second hierarchical level of the respective first and second IT workflow data. A display representing the first and second differences may be generated.

17 Claims, 6 Drawing Sheets

(56) References Cited

U.S. PATENT DOCUMENTS

| | | | |
|---|---|---|---|
| 2010/0088334 A1* | 4/2010 | Wasserman | G06F 16/2428 |
| | | | 707/769 |
| 2010/0293538 A1* | 11/2010 | Wolf | G06F 8/65 |
| | | | 717/170 |
| 2011/0071876 A1 | 3/2011 | Fong | |
| 2013/0111429 A1* | 5/2013 | Poole | G06Q 10/06 |
| | | | 717/101 |
| 2014/0039971 A1* | 2/2014 | Yano | G06Q 10/0633 |
| | | | 705/7.27 |
| 2014/0129285 A1* | 5/2014 | Wu | G06Q 10/0633 |
| | | | 705/7.27 |
| 2015/0088815 A1 | 3/2015 | Billapati et al. | |
| 2015/0178062 A1 | 6/2015 | Adderly et al. | |

OTHER PUBLICATIONS

Andreas Wombacher and Chen Li, "Alternative approaches for workflow similarity," 2010 IEEE International Conference on Services Computing, 2010, pp. 337-345 (Year: 2010).*
IBM, Comparing Two Versions of the Same Workflow, IBM TRIRIGA Application Platform 3.5.0, (No Date), 1 pg.
Kong, Nicholas, et al. "Delta: a tool for representing and comparing workflows." Proceedings of the SIGCHI Conference on Human Factors in Computing Systems. ACM, 2012., 10 pgs.
Starlinger, Johannes, et al. "Similarity search for scientific workflows." Proceedings of the VLDB Endowment 7.12 (2014): 12 pgs.
International Searching Authority., International Search Report and Written Opinion dated Nov. 25, 2016 for PCT Application No. PCT/US2016/019831 Filed Feb. 26, 2016, 14 pages.

* cited by examiner

DIFFERENCES IN HIERARCHICAL LEVELS OF INFORMATION TECHNOLOGY WORKFLOWS

BACKGROUND

An information technology (IT) environment may be managed in various ways. In some examples, the IT environment may be managed by creating an IT workflow to accomplish tasks of a process in the IT environment.

BRIEF DESCRIPTION

Some examples are described with respect to the following figures.

DETAILED DESCRIPTION

Figure 1:
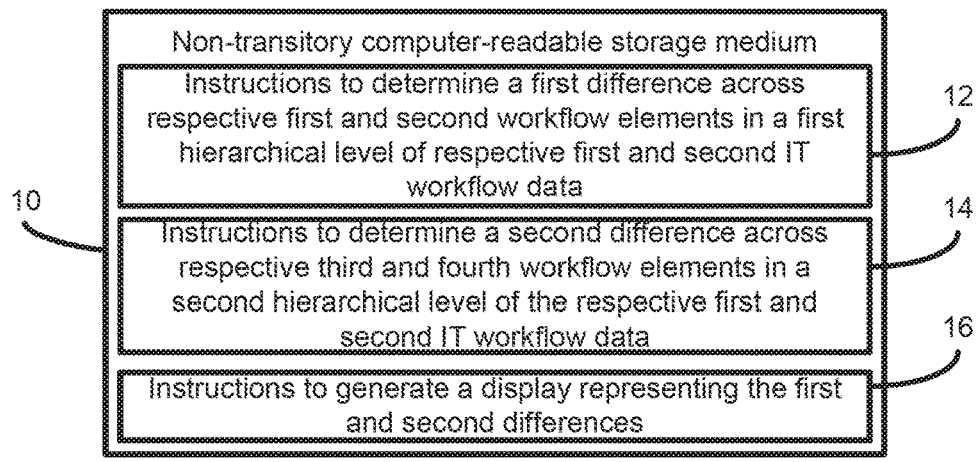
FIG. 1 is a block diagram illustrating a non-transitory computer readable storage medium according to some examples.

The following terminology is understood to mean the following when recited by the specification or the claims. The singular forms "a," "an," and "the" mean "one or more." The terms "including" and "having" are intended to have the same inclusive meaning as the term "comprising."

An IT workflow may be defined in IT workflow data, which provides a representation of a state machine that includes information on valid states (e.g. actions in an IT process) and how to transition between those states (e.g. relationships between the actions). The IT workflow may operate on an underlying system, such as an IT environment.

IT workflows may be classified into workflow types, which are based on the type of IT process to be executed in the IT workflow. For example, a workflow type may define which IT offering the IT workflow may implement. Example IT offerings include requests for IT service, requests for IT support, and requests for IT change. Other types of IT offerings may also be provided by IT workflows within the context of an IT management system, such as an information technology operations management (ITOM) system or an information technology service management (ITSM) system.

Each of the IT workflow data, based on its workflow type, may include IT workflow logic to implement its associated IT offering. In some examples, each state and transition of the IT workflow data may include IT workflow logic to run when in the state or transition. IT workflow logic may include a rule or an ordered list of rules to run when in the state or transition.

In some examples, the ordered list of rules may be classified into different hierarchical levels of an IT workflow. For example, the first level may be the IT workflow as a whole, the second level may include processes within the IT workflow, the third level may include metaphases within the processes, and the fourth level may include phases within the metaphases. Each of these levels may include rules from the ordered list of rules.

In some examples, IT workflow data representing model IT workflows may be provided, e.g. by a vendor along with IT management application. A model IT workflow may be a predetermined out-of-the-box IT workflow of a particular workflow type. Model IT workflows may implement any of the example IT offerings described earlier. For example, model IT workflow data for IT service requests may be provided.

In some examples, because some model IT workflows may be associated with broad or generic workflow types, users may wish to create a user-customized IT workflow data. In some examples, a user may create a user-customized IT workflow data, for example by modifying model IT workflow data. For example, model IT workflow data may be modified to comply with particular infrastructure requirements such as specification requirements for hardware components, and/or prior authorizations for hardware purchases, among others. In some examples, a user may add or delete IT workflow logic blocks, which may include at least one rule, into or from states and/or transitions in the IT workflow data.

In an example, an upgraded IT management application may be provided with new model IT workflow data relative those provided with a previous version of the IT management application. A user may attempt to migrate the user-customized IT workflow data used with the previous version of the IT management application so that they can be used with the upgraded IT management application. However, the user-customized IT workflow data may be similar to the new model IT workflow data provided with the upgraded IT management application. Understanding the differences in the workflow elements (including their rules) in the various hierarchical levels between the user-customized IT workflow and the model IT workflow may be difficult.

Accordingly, the present disclosure provides examples in which differences may be determined for corresponding workflow elements (including their rules) in user-customized IT workflow data and model IT workflow data across different hierarchical levels. These differences may then be displayed in a hierarchical format, so that a number of differences between the user-customized IT workflow and the model IT workflow within each workflow element of each hierarchical level (e.g. global workflow, processes, metaphases, phases, and transitions) may be viewed by a user. In some examples, using this display, the user may make changes to the user-customized IT workflow data based on the model IT workflow data.

FIG. 1 is a block diagram illustrating a non-transitory computer readable storage medium 10 according to some examples. The non-transitory computer readable storage medium 10 may include instructions 12 executable by a processor to determine a first difference across respective first and second workflow elements in a first hierarchical level of respective first and second IT workflow data. The non-transitory computer readable storage medium 10 may include instructions 14 executable by a processor to determine a second difference across respective third and fourth workflow elements in a second hierarchical level of the respective first and second IT workflow data. The non-transitory computer readable storage medium 10 may include instructions 16 executable by a processor to generate a display representing the first and second differences.

Figure 2:
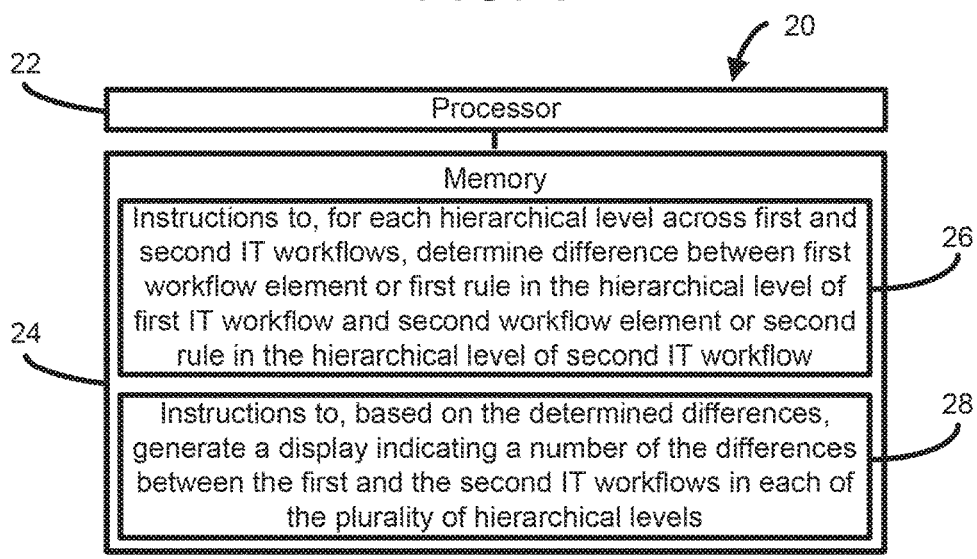
FIGS. 2 and 4 are block diagrams illustrating systems according to some examples.

FIG. 2 is a block diagram illustrating a system 20 according to some examples. The system 20 may include a processor 22 and a memory 24. The memory 24 may include instructions 26 executable by the processor to, for each of a plurality of hierarchical levels across a first IT workflow and a second IT workflow, determine a difference between a first workflow element or a first rule in the hierarchical level of the first IT workflow and a second workflow element or a second rule in the hierarchical level of the second IT workflow. The memory 24 may include instructions 28 executable by the processor to, based on the determined differences, generate a display indicating a number of the differences between the first and the second IT workflows in each of the plurality of hierarchical levels.

Figure 3:
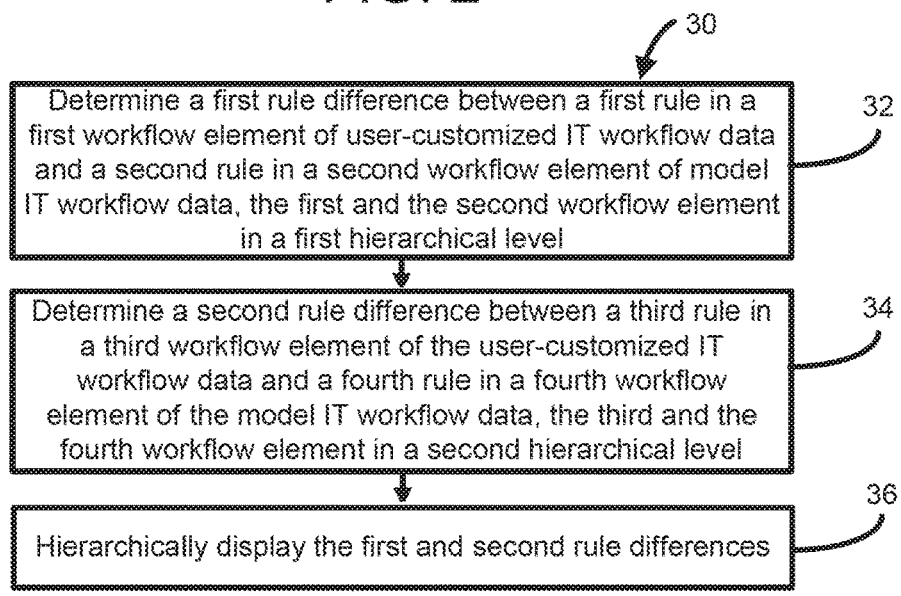
FIGS. 3 and 8 are flow diagrams illustrating methods according to some examples.

FIG. 3 is a flow diagram illustrating a method 30 according to some examples. The following may be performed by a processor. At 32, a first rule difference may be determined between a first rule in a first workflow element of user-customized IT workflow data and a second rule in a second workflow element of model IT workflow data, the first and the second workflow element in a first hierarchical level. At 34, a second rule difference may be determined between a third rule in a third workflow element of the user-customized IT workflow data and a fourth rule in a fourth workflow element of the model IT workflow data, the third and the fourth workflow element in a second hierarchical level. At 36, the first and the second rule differences may be hierarchically displayed. A hierarchical display is a display where differences are displayed in a manner indicating that a second difference is in a hierarchical level that is lower than the hierarchical level in which the first difference is found. For example, the second difference may be displayed in a nested manner relative to the first difference.

Figure 4:
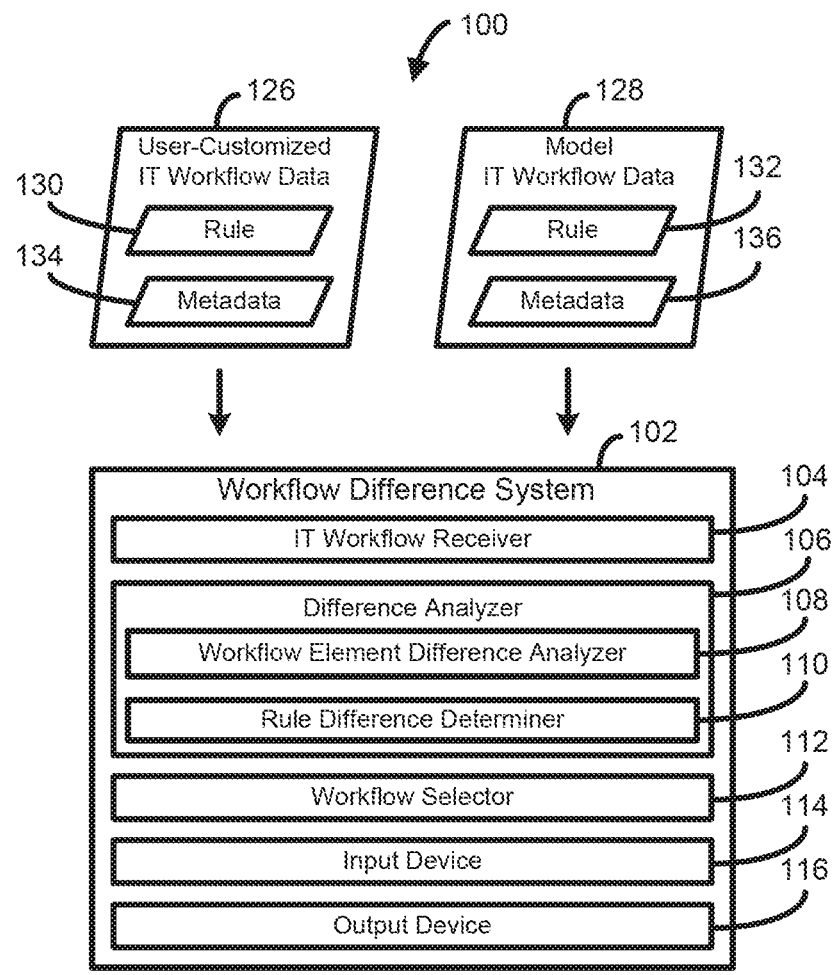

FIG. 4 is a block diagram illustrating a system 100 according to some examples. The system 100 includes a workflow difference system 102. The workflow difference system 102 may include an IT workflow receiver 104, difference analyzer 106, difference displayer 112, and workflow selector 112. The difference analyzer 106 may include workflow element difference analyzer 108 and rule difference determiner 110. In various examples, additional elements may be added and/or some of the elements described above may be omitted.

In some examples, these components of the workflow difference system 102 may be implemented as a computing system including a processor, a memory such as non-transitory computer readable medium coupled to the processor, and instructions such as software and/or firmware stored in the non-transitory computer-readable storage medium. The instructions may be executable by the processor to perform processes defined herein. In some examples, the components may include hardware features to perform processes described herein, such as a logical circuit, application specific integrated circuit, etc. In some examples, multiple components may be implemented using the same computing system features or hardware.

In some examples, the workflow difference system 102 may support direct user interaction. For example, the workflow difference system 102 may include user input device 114, such as a keyboard, touchpad, buttons, keypad, dials, mouse, track-ball, card reader, or other input devices. Additionally, the workflow difference system 102 may include output device 116 such as a liquid crystal display (LCD), video monitor, touch screen display, a light-emitting diode (LED), or other output devices. The output devices may be responsive to instructions to display textual information or graphical data. The output device 116 may include a viewing area to allow a user to view the user customized IT workflow data and the model IT workflow data.

In some examples, the IT workflow receiver 104 (e.g. an application programming interface (API), such as the REST API, of the workflow difference system 102) may receive, through a communication interface, IT workflow data 126 representing a user-customized IT workflow and IT workflow data 128 representing a model IT workflow from a data source via a communication network. The data source may be an IT management application running on a computing device in the workflow difference system 102, such as a server in a data center, a personal computer, or the like. In other examples, the IT management application may and the workflow difference system 102 may be included in the same computing device or system. As discussed earlier, the IT workflow data 128 representing the model IT workflow may be provided with the IT management application by a vendor, whereas the IT workflow data 126 representing the user-customized IT workflow may be created by a user for use with the IT management application. In some examples, the user may generate the IT workflow data 126 using the IT management application.

Each of the IT workflow data 126 and 128 may include IT workflow logic to implement its respective associated IT offering. As discussed earlier, in some examples, some or each of the states and transitions of each of the IT workflow data 126 and 128 may include IT workflow logic to run when in the state or transition. IT workflow logic may include a rule or an ordered list of rules to run when in the state or transition. IT workflow logic may include instructions, such as data structures or functions, which produce a part of an IT workflow. As shown in FIG. 4, the IT workflow data 126 may include rule 130 and metadata 134, and the IT workflow data 128 may include rule 132 and metadata 136.

In some examples, the rules may written in various computer languages, including combinations of different computer languages. A computer language is understood herein to be any language for communicating instructions on a computer. In some examples, some rules may include non-scripted declarative language, which is a computer language other than a scripted language and is descriptive in nature. For example, a non-scripted declarative rule may read "If a request is made for a new device, then the request must be approved by a manager." In some examples, rules may be written in a general-purpose language (GPL), which is a computer language that is applicable across domains, and may lack specialized features for a particular domain. In some examples, the rules may be written in a domain-specific language (DSL) which is a computer language that is suitable for a particular domain, such as for usage with the IT management application.

Rules are defined herein to include condition clauses and action clauses. A condition clause includes at least one logical condition to be satisfied, and an action clause includes at least one action to be performed in response to the condition being satisfied. Each of the condition clauses and action clauses may include sequences of segments drawn from several categories, including but not limited to: (1) conditional expressions, which represent logical conditions to be satisfied (e.g. in a DSL); (2) conjunctions, such as "and", "or", "xor", "if", etc.; (3) parameters, such as a variable (e.g. written as a string), a value to which the variable is to be set (e.g. in a DSL), a map parameter, and a list parameter; (4) prepositions, such as "to", etc.; and (5) actions, such as "set".

Figure 5:
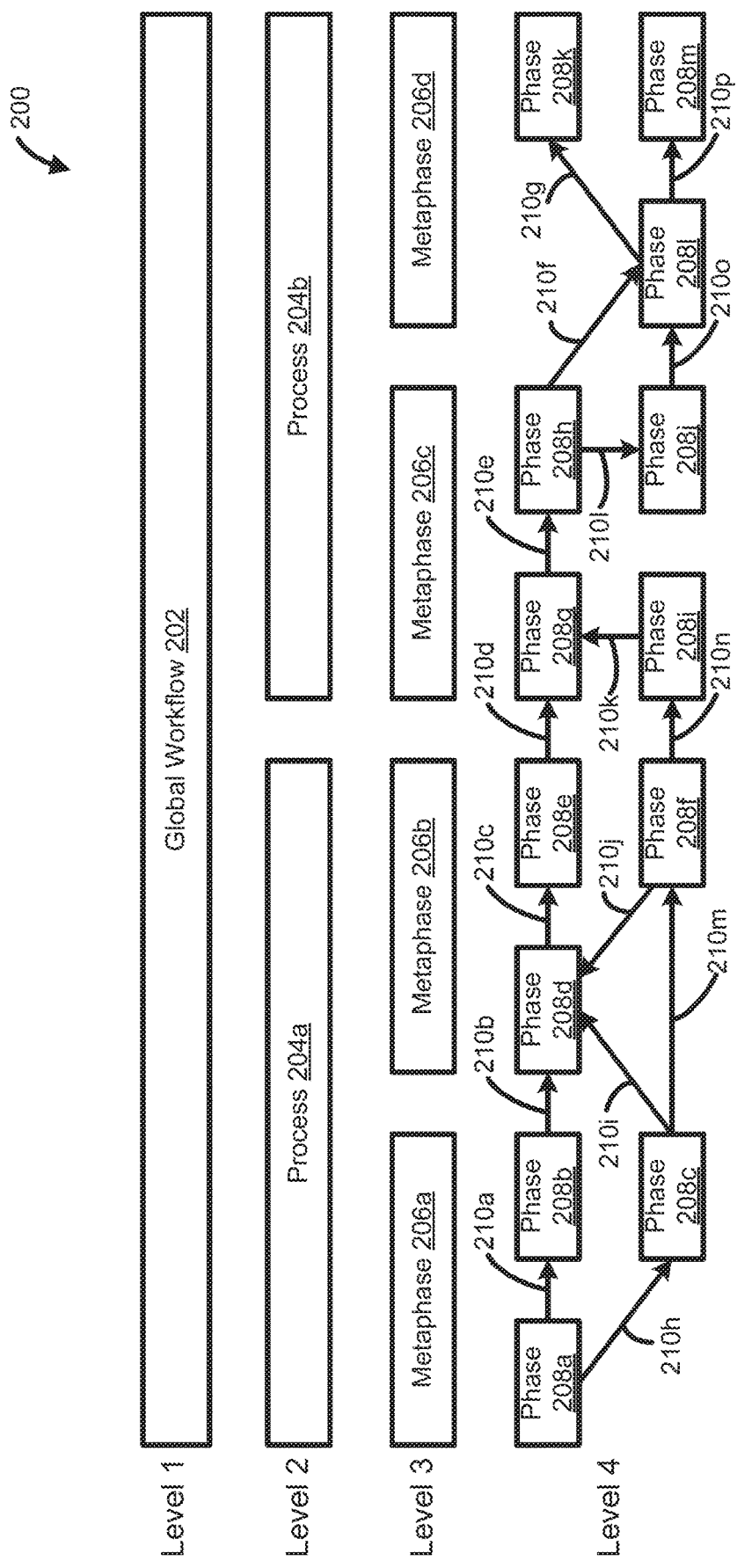
FIG. 5 is a diagram illustrating hierarchical levels of an IT workflow according to some examples.

FIG. 5 is a diagram illustrating hierarchical levels of an IT workflow 200 according to some examples. The IT workflow may represent the structure of IT workflows represented by each of the IT workflow data 126 and 128. The hierarchical levels may include workflow elements including a global workflow 202, processes 204a-b, metaphases 206a-d, phases 208a-m, and transitions 210a-p.

The first level (e.g. top level) may include the global workflow 202, which may span the entire IT workflow. The second level may include processes 204a-b within the global workflow 202. The third level may include metaphases 206a-b within each process 204a and metaphases 206c-d in process 204b. The fourth level (e.g. the bottom level) may include phases 208a-c within metaphase 206a, phases 208d-f within metaphase 206b, phases 208g-j within metaphase 206c, and phases 208k-m within metaphase 206d. The fourth level may also include transitions 210a-p between phases 208a-p, which may indicate connectivity between phases 208a-p (e.g. unconnected phases may not transition directly between each other). In some examples, greater or fewer levels and/or workflow elements within the levels may be provided.

Each of the workflow elements (global workflow 202, processes 204a-b, metaphases 206a-d, phases 208a-m, and transitions 210a-p) of each of the hierarchical levels may contain rules. The execution flow of the IT workflow 200 may begin at phase 208a. In some examples, the rules may then be executed according to the following rules. The current phase may be executed, after which the rules of the metaphase in which the current phase is in may be executed, after which the rules of the process in which the metaphase (in which the current phase is in) is in may be executed, after which the rules of the global workflow 202 may be executed. Based on an action performed by these rules, a transition leading from the current phase to a subsequent phase may be selected. If multiple transitions lead from the current phase to the subsequent phase, then one of the transitions may be selected based on the action. In some examples, the rules in the selected transition may be executed. Then, the rules in the subsequent phase may be executed, followed by rules in its metaphase and process, and in the global workflow 202. The process may continue. An example execution flow of rules is shown in Table 1. Although rules in the first 14 workflow elements are shown, the execution may continue through additional workflow elements.

TABLE 1

Example Execution Flow of IT Workflow 200

| | |
|---|---|
| 1 | Rules in Phase 208a |
| 2 | Rules in Metaphase 206a |
| 3 | Rules in Process 204a |
| 4 | Rules in Global Workflow 202 |
| 5 | Rules in Transition 210a |
| 6 | Rules in Phase 208c |
| 7 | Rules in Metaphase 206a |
| 8 | Rules in Process 204a |
| 9 | Rules in Global Workflow 202 |
| 10 | Rules in Transition 210b |
| 11 | Rules in Phase 208d |
| 12 | Rules in Metaphase 206b |
| 13 | Rules in Process 204a |
| 14 | Rules in Global Workflow 202 |

In some examples, the rules executed in the IT workflow may differ depending on an "event", which is understood herein to refer to an event or state occurring in the underlying system (e.g. an IT environment) on which the IT workflow operates. Therefore, in some examples, each rule in each workflow element of each level may be associated with an event from a plurality of events associated with the IT workflow. For example, if the IT workflow 200, two of the events associated with the IT workflow 200 may be "Before Change" and "After Change" (e.g. referring a change in a parameter of the underlying system on which the IT workflow is to operate). Therefore, in the example of Table 1, each of the rules may be associated with "Before Change". A different set of rules corresponding to the same workflow elements may be associated with "After Change".

Turning back to FIG. 4, in an example, Table 2 depicts the rule 130 in the IT workflow data 126 representing the model IT workflow, and Table 3 depicts the rule 132 in the IT workflow data 128 representing the user-customized IT workflow. Each of the IT workflow data 126 and 128 may include additional rules relative to respective rules 130 and 132 such that they each include an ordered list of rules for each of the workflow elements in each of the levels in the IT workflow data 126 and 128.

TABLE 2

Rule 130 in IT Workflow Data 126 Representing Model IT Workflow

If ${current_update.Solution.IsChanged and
(current_update.Solution.NewValue == 'NoSuchSolution' or
entity.Category == 'Category2' || entity.Category == 'Category1')}
Set Solution to ${current_update.Solution.OldValue}

TABLE 3

Rule 132 in IT Workflow Data 128 Representing User-Customized IT Workflow

If ${current_update.Solution.IsChanged &&
(current_update.Solution.NewValue == 'NoSuchSolution'
||entity.Category == 'Category1')} Set Solution to
${current_update.Solution.OldValue}

The example rule 130 states that (1) if a Solution parameter has been changed, and (2) if the changed value of the Solution is "no solution" or if the parameter associated with the IT environment (i.e. entity category) on which the IT workflow runs is of a first or second value; then the Solution parameter is to be set to its previous value (the value it had before being changed). The example rule 132 states that (1) if a Solution parameter has been changed, and (2) if the changed value of the Solution is "no solution" or if parameter associated with the IT environment (i.e. entity category) on which the IT workflow runs is of a first value; then the Solution parameter is to be set to its previous value (the value it had before being changed).

As discussed earlier, the IT workflow data 126 and 128 may include respective metadata 134 and 136, which may parse segments of the respective rules 130 and 132, and specify the category of each segment. Example parsing and categorization of each segment of the rules 130 and 132 provided by the metadata 134 and 136 are shown in Tables 4 and 5.

TABLE 4

Rule 130 and Associated Metadata 134

| | Metadata 134 | Rule 130 |
|---|---|---|
| Condition clause | Conjunction | If |
| | Conditional expression (in DSL) | ${current_update.Solution.IsChanged |
| | Conjunction | and |
| | Conditional expression (in DSL) | current_update.Solution.NewValue == 'NoSuchSolution' |
| | Conjunction | or |
| | Conditional expression (in DSL) | entity.Category == 'Category2' |
| | Conjunction | || |

TABLE 4-continued

Rule 130 and Associated Metadata 134

| | Metadata 134 | Rule 130 |
|---|---|---|
| | Conditional expression (in DSL) | entity.Category == 'Category1' |
| Action Clause | Action | Set |
| | Parameter (string) | Solution |
| | Preposition | to |
| | Parameter (in DSL) | ${current_update.Solution.OldValue} |

TABLE 5

Rule 132 and Associated Metadata 136

| | Metadata 136 | Rule 132 |
|---|---|---|
| Condition clause | Conjunction | If |
| | Conditional expression (in DSL) | ${current_update.Solution.IsChanged} |
| | Conjunction | && |
| | Conditional expression (in DSL) | current_update.Solution.NewValue == 'NoSuchSolution' |
| | Conjunction | \|\| |
| | Conditional expression (in DSL) | entity.Category == 'Category1' |
| Action Clause | Action | Set |
| | Parameter (string) | Solution |
| | Preposition | to |
| | Parameter (in DSL) | Set |

In the examples of Tables 2-5, map and list parameters are not shown. A map parameter includes (e.g. after the action "Set") a variable and a value to which the variable is to be set, and e.g. separated by a separator such as a colon. The map parameter may include several pairs of variables and values. The map parameter may be part of an action clause. An example map parameter is "Set ExpertAssignee: ${entity.AssignedPerson} CurrentAssignment: ExpertGroup". A list parameter includes (e.g. after the action "Validate") a variable and a list of values. The list parameter may be part of an action clause. An example list parameter is "Validate that Current Assignment is in Service Desk, Expert Group, or Incident". In this example, the variable "Current Assignment" is checked to see if it has a value from the list of values "Service Desk", "Expert Group", or "Incident".

Figure 6:
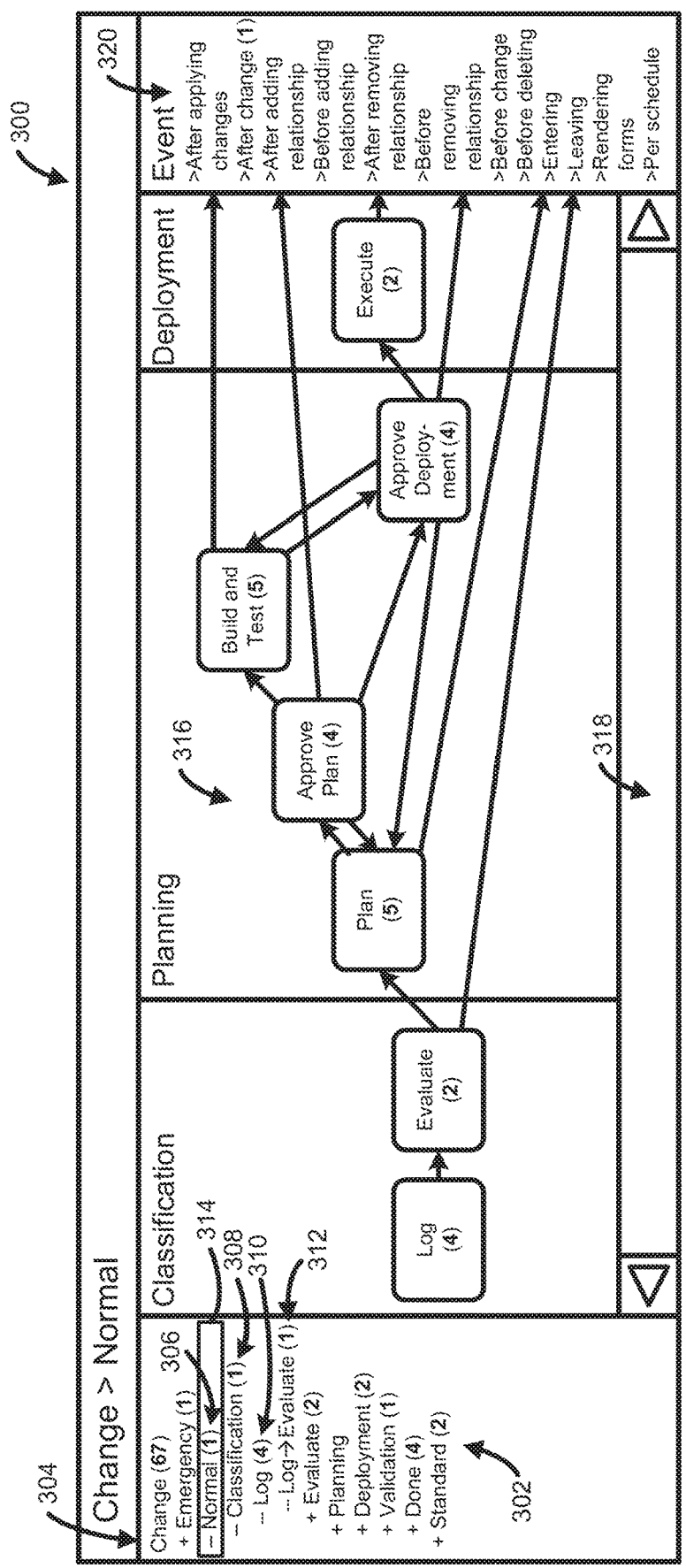
FIGS. 6 and 7 are screenshots displaying IT workflow data according to some examples.

FIG. 6 is a screenshot 300 displaying IT workflow data according to some examples. In this example, the screenshot 300 shows representations of the IT workflow data, which may be the user customized IT workflow data 126 or the model IT workflow data 128. The screenshot 300 may be displayed by the output device 116.

As discussed earlier, IT workflow data may include workflow elements across hierarchical levels, and the rules within each workflow element may be associated with an event. In FIG. 6, each of the workflow elements in these hierarchical levels are viewable and selectable in a collapsible nested drop down menu 302. In the first hierarchical level, the global workflow 304 is "Change" which represents an IT change process. In the second hierarchical level, the processes 306 are "Emergency", "Normal" and "Standard". In this example, "Emergency" and "Standard" are collapsed such that their metaphases and phases are not viewable, but "Normal" is expanded. In the third hierarchical level, within the "Normal" process, the metaphases 308 are "Classification", "Planning", "Deployment", "Validation", and "Done". In this example, "Planning", "Deployment", "Validation", and "Done" are collapsed such that their meta-phases and phases are not viewable, but "Classification" is expanded. In the fourth hierarchical level, the phases 310 are "Log" and "Evaluate". In this example, "Evaluate" is collapsed such that transitions associated with the "Evaluate" phase are not viewable, but "Log" is expanded. As the phase "Log" is expanded, any transitions 312 involving the phase 310 may be shown. In this example, the transition 312 between the "Log" and "Evaluate" phases is shown.

In FIG. 6, each of the workflow elements are shown with a number adjacent to the workflow element name. Each number may represent a number of rules within that the associated workflow element. For example, the "Normal" process 306 includes 1 business rule, as shown.

In FIG. 6, the process 306 "Normal" has been selected by a user with a highlight tool 314 such that its metaphases 308, phases 310, and transitions 312 are graphically viewable as a flowchart 316. As shown, the connectivity between different phases 310 via transitions 312 is shown. The scroll bar 318 may be used to scroll to see additional portions of the process 306 "Normal" that are not shown in FIG. 6.

In some examples, events 320 associated with the IT workflow may be displayed as well, and the associated number of rules associated with event for a particular workflow element on the hierarchical levels may be displayed. In the example of FIG. 6, 12 events are shown. Additionally, in FIG. 6, because the "Normal" process 306 is selected, the number of rules in the "Normal" process 306 that are associated with each of the events is shown. In this example, 1 rule is associated with the "After Change" event 320, and no rules are associated with other events 320.

Turning back to FIG. 4, the difference analyzer 106 may identify differences between the user-customized IT workflow data 126 and the model IT workflow data 128. The difference analyzer 106 may perform these processes using its workflow element difference analyzer 108 and its rule difference determiner 110.

In some examples, the workflow element difference analyzer 108 may identify differences between workflow elements in the hierarchical levels of the IT workflows.

In some examples, the workflow element difference analyzer 108 may determine whether there are any differences in the respective global workflows (in the first hierarchical level) of the user-customized IT workflow data 126 and the model IT workflow data 128, for example based on metadata associated with the global workflows such as IDs (e.g. names) of the global workflows. For example, if one global workflow is a "Change" global workflow whereas the other global workflow is a "Service" global workflow, then the workflow element difference analyzer 108 may determine that the global workflows are different. In this case, the workflow element difference analyzer 108 may not perform any other analysis as the IT workflows as a whole may be different, and therefore the rule difference determiner 110 may, in some examples, not determine differences for rule pairs in the IT workflow data. If the workflow element difference analyzer 108 determines that the global workflows are a match, then the processes within the matching global workflows may be marked for similar analysis by the workflow element difference analyzer 108, and the rules within the matching global workflows may be marked for rule difference determinations.

In some examples, upon determining that the respective global workflows match, the workflow element difference analyzer 108 may determine whether there are any differences in the respective processes (in the second hierarchical level) of the user-customized IT workflow data 126 and the model IT workflow data 128, for example based on metadata associated with the processes such as IDs (e.g. names) of the processes. If the workflow element difference analyzer 108 determines that any processes are a match, then metaphases within the matching processes may be marked for similar analysis by the workflow element difference analyzer 108, and the rules within the matching processes may be marked for rule difference determinations.

In some examples, upon determining that any processes across the user-customized IT workflow data 126 and the model IT workflow data 128 match, the workflow element difference analyzer 108 may determine whether there are any differences in the respective metaphases (in the third hierarchical level) of the user-customized IT workflow data 126 and the model IT workflow data 128, for example based on metadata associated with the metaphases such as IDs (e.g. names) of the metaphases. If the workflow element difference analyzer 108 determines that any metaphases are a match, then phases and transitions within the matching processes may be marked for similar analysis by the workflow element difference analyzer 108, and the rules within the matching metaphases may be marked for rule difference determinations.

In some examples, upon determining that any metaphases across the user-customized IT workflow data 126 and the model IT workflow data 128 match, the workflow element difference analyzer 108 may determine whether there are any differences in the respective phases and transitions (in the fourth hierarchical level) of the user-customized IT workflow data 126 and the model IT workflow data 128, for example based on metadata associated with the phases and transitions such as IDs (e.g. names) of the phases and transitions. For the transitions, connectivity between the same phases may be checked to determine whether the transitions match. If the workflow element difference analyzer 108 determines that any phases and/or transitions are a match, then the rules within the matching phases and/or matching transitions may be marked for rule difference determinations.

In some examples, the rule difference determiner 110 may determine a rule difference between ordered lists of rules within matching workflow elements (e.g. matching global workflows, processes, metaphases, phases, and transitions) across the IT workflow data 126 and 128, for example within the workflow elements marked for rule difference determination by the workflow element different analyzer 108. A "rule difference" is a difference determination between any two sets of rules, wherein each of the set includes one rule or multiple rules. For example, for each set of matching workflow elements, the rule difference determiner 110 may determine the Levenshtein distance between a first ordered list of rules (e.g. including rule 130) in the workflow element of user-customized IT workflow data 126 and a second ordered list of rules (e.g. including rule 132). The Levenshtein distance between two texts is defined herein as the minimum number of single character edits (e.g. insertions, deletions, and/or substitutions) to transform between the texts. In some examples, the rule difference determiner 110 may normalize the determined Levenshtein distance to a value between 0 (completely different, e.g. if every character in the first ordered list is changed to transform to the second ordered list) and 1 (identical, e.g. if no characters are transformed). In some examples, measures other than Levenshtein distance may be used for rule difference determination, for example Dice coefficients. Thus, the rule difference determiner 110 may determine that a rule difference exists if the Levenshtein distance indicates that the lists of rules in the matching workflow elements are not identical.

In some examples, the rule difference determiner 110 may also determine whether rules in the ordered lists are added, deleted, or moved relative to each other. To identify individual rules in the ordered lists of rules, the rule difference determiner 110 may analyze metadata (e.g. metadata 134 and 136) of the rules in the ordered lists. For example, IDs in the metadata may indicate parsing of the ordered lists of rules into individual rules. In some examples, certain segments of text in each of the rules may be treated as IDs to identify individual rules.

Then, for each set of matching workflow elements, using the IDs, the rule difference determiner 110 may determine whether the first ordered list of rules includes rules that the second ordered list of rules does not (e.g. the first ordered list includes 4 rules ordered as A1, B1, C1, and D1 and the second ordered list includes 3 rules ordered as A2, B2, and C2, indicating an added rule in the first ordered list), whether the second ordered list of rules includes rules that the first ordered list does not (e.g. the first ordered list includes 3 rules ordered as A1, B1, and C1 and the second ordered list includes 3 rules ordered as A2, B2, C2, and D2, indicating a removed rule in the first ordered list), and whether the same rule appears in a different location in the first ordered list relative to in the second ordered list (e.g. the first ordered list includes 4 rules ordered as A1, B1, C1, D1 and the second ordered list includes 4 rules ordered as A2, B2, D2, and C2, indicating two moved rules). Thus, the determinations of any rule additions, deletions, and moves may each be counted as rule differences.

In some examples, the rule difference determiner 110 may also determine a respective rule difference between individual rules (e.g. rule 130 and 132) with matching IDs across the matching workflow elements in the IT workflow data 126 and 128. That is, for each set of matching workflow elements, rule differences may be determined for each rule pair (e.g. a pair of rules having the same ID as discussed earlier) across the IT workflow data 126 and 128. In some examples, these individual rule differences may be differences between the entire rules 130 and 132. In some examples, the differences may be between respective portions of the rules 130 and 132 (and not the entire rules 130 and 132). In some examples, the respective portions may comprise segments (e.g. all texts, condition clauses, action clauses, DSL texts, strings, parameters, conditional expressions, conjunctions, actions, other segments, and/or combinations thereof) in the condition clauses. Thus, the rule difference determiner 110 may determine that a rule difference exists if the two rules in a rule pair are not identical.

Therefore, the rule difference determiner 110 may determine a number of rule differences between the IT workflows. In particular, the rule difference determiner 110 may, for each set of matched workflow elements across the IT workflow data 126 and 128, sum the number of rule differences. The number of rule differences may be a sum of any combination of the following: (1) one rule difference is added for each case where a first ordered list in a workflow element is not identical to a second ordered list in a matching workflow element; (2) one rule difference is added for each case where the same rule is moved to a different location in a first ordered list in a workflow element relative to in a second ordered list in a matching workflow element; (3) one rule difference is added for each rule that is present in one IT workflow element but not in the matching workflow element (e.g. additions and deletions); and (4) one rule difference is added for each set of individual rules with matching IDs that are not identical in matching rules in matching workflow elements. In some examples, different rule difference values may be provided for each of these factors, e.g. a first rule difference for ordered lists in matching workflow elements being different, a second rule difference for each rule, a third rule difference for each added rule, a fourth rule difference for each deleted rule, and a fifth rule difference for rule pairs (e.g. individual rules with matching IDs across matching workflow elements) that are different, and additional rule differences for rule pairs in which a specific property is modified in one rule relative to the other (e.g. condition clauses, action clauses, DSL texts, strings, parameters, conditional expressions, conjunctions, actions, etc.)

In some examples, in addition to rule differences, the workflow element differences determined by the workflow element difference analyzer 108 may also be summed into a total number of "differences". In examples, these total number of differences may then be displayed, as will be discussed, or the total rule differences, specific types of rule differences, or workflow element differences may be individually displayed.

Figure 7:
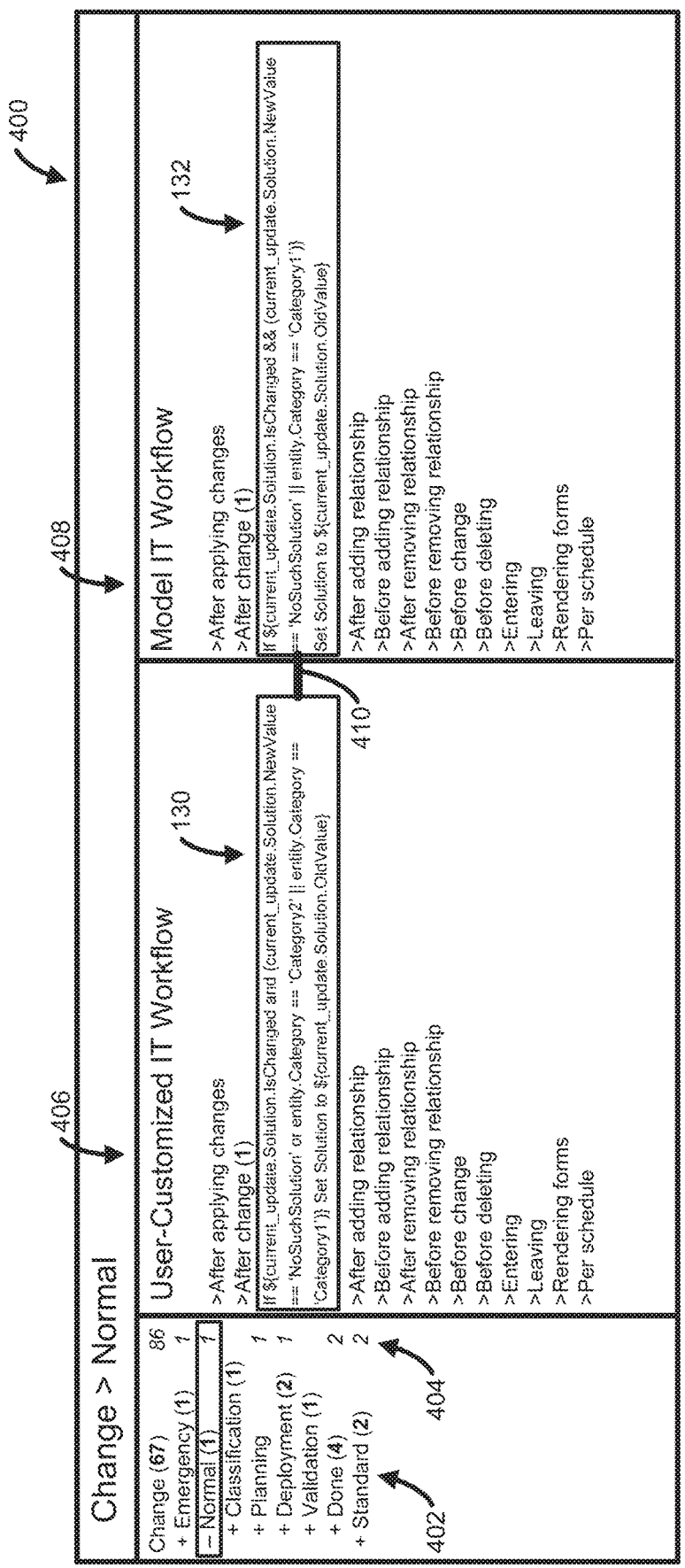

FIG. 7 is a screenshot 400 displaying IT workflow data according to some examples. In this example, the screenshot 300 shows representations of the IT workflow data 126 and the model IT workflow data 128. The screenshot 300 may be displayed by the output device 116. FIG. 7 additionally displays a collapsible nested drop down menu 402 that includes the same workflow elements as the collapsible drop down menu 302 of FIG. 6. In this example, both the IT workflow data 126 and the IT workflow data 128 may contain all of the same workflow elements as each other, therefore the collapsible nested drop down menu may contain the same workflow elements in the same structure. However, in other examples, the IT workflow data 126 and 128 may contain some similar workflow elements and some different workflow elements. Similar to FIG. 6, each of the workflow elements are shown with a number adjacent to the workflow element name. Each number may represent a number of rules within that the associated workflow element. For example, the "Normal" process includes 1 business rule, as shown.

However, FIG. 7 may additionally include, to the right of the numbers representing the number of rules within the workflow elements, difference numbers 404 representing the number of differences (determined by the difference analyzer 106) within each set of matched workflow elements. In FIG. 7, the "Normal" process has been selected by a user with a highlight tool such that the one rule 130 within the "Normal" process of the user-customized IT workflow data 126 appears in the viewing area 406 and the one rule 132 within the "Normal" process of the model IT workflow data 128 appears in the viewing area 408. As shown, the rules 130 and 132 each may be associated with the "After change" event, and no rules may be associated with other events. In this example, the difference analyzer 106 may determine that the rules 130 and 132 as a whole are different (e.g. because rule 130 contains "entity.Category='Category2' whereas rule 132 does not), and therefore may determine that one difference exists in the "Normal" process, and may display a rule difference number 404 representing one difference next to the "Normal" process within the menu 402. In other examples, other rule difference determinations may be made, for example multiple rule differences if a single rule pair contains multiple differences in different segments, or if rules have been moved, as discussed earlier. In other examples, if phases and transitions within the "Normal" process contain differences, those additional differences may be included in the difference number 404.

Therefore, 86 rule differences may be present in the "Change" global workflow, 1 rule difference may be present in each of the "Emergency" and "Normal" processes and the "Planning" and "Deployment" metaphases, and 2 rule differences may be present in each of the "Done" metaphase and the "Standard" process. In this way, rule differences may be viewed hierarchically so that a user may drill down to determine the location of rule differences within the IT workflow data 126 and 128.

In some examples, the difference numbers 404 may be displayed in an aggregated manner across multiple workflow elements. For example, the difference number 404 associated with "Change" global workflow may indicate the number of rule differences across the entire IT workflows 126 and 128 (including all workflow elements in all of the hierarchical levels). Additionally, workflow elements in a given hierarchical level may have a difference number 404 indicating a number of differences within all associated workflow elements contained in associated lower hierarchical levels. For example, for the "Normal" process, the difference number 404 may include the number of differences in the "Normal" process, plus the number of differences in the "Classification", "Planning", "Deployment", "Validation", and "Done" metaphases, the number of rule differences in phases within these metaphases, and the number of differences in transitions connected to these phases.

In some examples, rather than displaying difference numbers 404, a different type of element (e.g. a graphical element) may be displayed indicating a number of rule differences, such as geometric object scaled to the size associated with (e.g. proportionate to) the number of rule differences.

In some examples, the workflow selector 112 may, through the output device 116 of the workflow difference system 102, provide a user interface indicating that a user has an option to select the rule 132 in the model IT workflow data 128 for usage by a user (rather than the rule 130 in the user-customized IT workflow data 126) in response to the rule 130 having a difference relative to the rule 132. Thus, the rule 132 may be caused to be selectable (e.g. by a user or automatically) to manage the IT environment. In some examples, the indication may take the form of a notification in the viewing area provided by the output device 116. In some examples, the notification may be a textual notification. As shown in FIG. 4, the notification may include a linkage 410 (e.g. in FIG. 7) between the depiction of rules 130 and 132 in the viewing area indicating that the rule 132 may be used. Similar indications may be provided for differences between any other rule pairs, ordered lists, workflow elements, and/or to select the IT workflow data 128 as a whole.

The user may then select, using the input device 114, to use the rule 132 when running the IT workflow, and cause the IT workflow to run. In some examples, the user may replace the user-customized IT workflow with the model IT workflow entirely, and run the model IT workflow to manage the IT environment. The workflow selector 112 may receive the input from the input device 114. In response to differences not being found, no indications may be made. In some examples, the workflow difference system 102 may log when rules are modified or moved, and when rules from a model IT workflow are selected by a user to replace rules from a user-customized IT workflow. Additionally, the identity of the user who performed the change may be logged. In this way, users may be aided in debugging and investigating IT workflow configurations.

Figure 8:
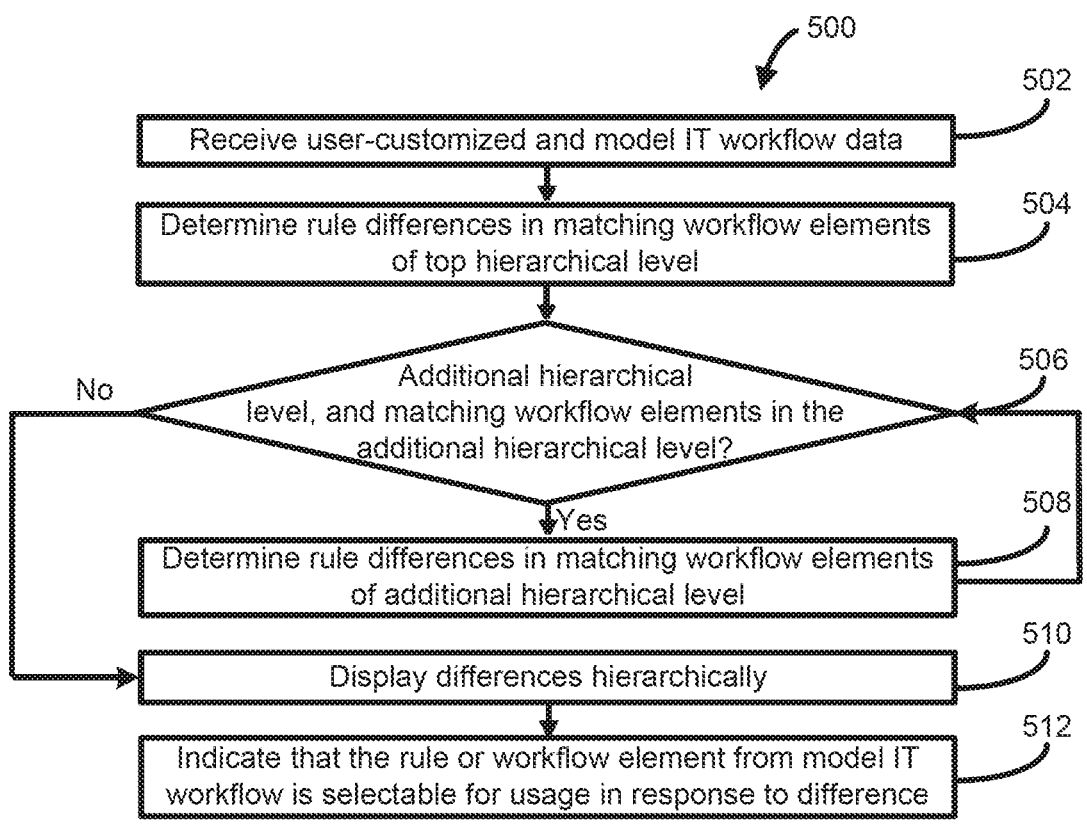

FIG. 8 is a flow diagram illustrating a method 500 according to some examples.

In some examples, the orderings shown may be varied, some elements may occur simultaneously, some elements may be added, and some elements may be omitted. In examples, any of the elements described earlier relative to FIGS. 4-7 may be implemented in the process shown in and described relative to FIG. 8.

At 502, the IT workflow receiver 104 may receive IT workflow data 126 representing a user-customized IT workflow and IT workflow data 128 representing a model IT workflow. Any processes previously described as implemented by the IT workflow receiver 104 may be implemented at 502.

At 504, the rule difference determiner 110 may determine rule differences in workflow elements in a top hierarchical level of the IT workflow data. Any processes previously described as implemented by the rule difference determiner 110 may be implemented at 504.

At 506, the difference analyzer 106 (e.g. workflow element difference analyzer 108) using the may determine whether additional hierarchical levels exist in the IT workflow data 126 and 128, and whether there are matching workflow elements in the additional hierarchical level. If yes to both determinations, the method 500 may proceed to 508, otherwise the method 500 may proceed to 510. Any processes previously described as implemented by the difference analyzer 106 (e.g. workflow element difference analyzer 108) may be implemented at 506.

At 508, the workflow element difference analyzer 108 may determine rule differences within the workflow elements of the additional hierarchical level. Any processes previously described as implemented by the workflow element difference analyzer 108 may be implemented at 508. The method may proceed from 508 back to 506.

At 510, the output device 116 may display the determined rule differences hierarchically, e.g. as shown in the screenshot 400 of FIG. 7.

At 512, the workflow selector 112 may indicate that the rule 132 in the model IT workflow data 128 may be selected for usage by a user (rather than the rule 130 in the user-customized IT workflow data 126) in response to a rule difference between rules 130 and 132. Similar indications may be made for ordered lists of rules and workflow elements in the model IT workflow data 128. Any processes previously described as implemented by the workflow selector 112 may be implemented at 512.

Any of the processors discussed herein may comprise a microprocessor, a microcontroller, a programmable gate array, an application specific integrated circuit (ASIC), a computer processor, or the like. Any of the processors may, for example, include multiple cores on a chip, multiple cores across multiple chips, multiple cores across multiple devices, or combinations thereof. In some examples, any of the processors may include at least one integrated circuit (IC), other control logic, other electronic circuits, or combinations thereof. Any of the non-transitory computer-readable storage media described herein may include a single medium or multiple media. The non-transitory computer readable storage medium may comprise any electronic, magnetic, optical, or other physical storage device. For example, the non-transitory computer-readable storage medium may include, for example, random access memory (RAM), static memory, read only memory, an electrically erasable programmable read-only memory (EEPROM), a hard drive, an optical drive, a storage drive, a CD, a DVD, or the like.

All of the features disclosed in this specification (including any accompanying claims, abstract and drawings), and/or all of the elements of any method or process so disclosed, may be combined in any combination, except combinations where at least some of such features and/or elements are mutually exclusive.

In the foregoing description, numerous details are set forth to provide an understanding of the subject disclosed herein. However, examples may be practiced without some or all of these details. Other examples may include modifications and variations from the details discussed above. It is intended that the appended claims cover such modifications and variations.

The invention claimed is:

1. A non-transitory computer-readable storage medium comprising instructions executable by a processor to:
   receive a model information technology (IT) workflow data of an IT application and a user-customized IT workflow data of the IT application, wherein each of the model IT workflow data and the user-customized IT workflow data includes rules arranged in hierarchical levels;
   determine a first difference between a first rule in a first hierarchical level of the model IT workflow data and a second rule in a first hierarchical level of the user-customized IT workflow data;
   after determining the first difference between the first rule and the second rule in the first hierarchical level, determine a second difference between a third rule in a second hierarchical level of the model IT workflow data and a fourth rule in a second hierarchical level of the user-customized IT workflow data;
   generate a display of the first difference and the second difference in a hierarchical format according to the hierarchical levels of the model IT workflow data and the user-customized IT workflow data, wherein the first difference and the second difference are displayed as selectable options, wherein the first rule includes a first condition clause and a first action clause, and the second rule includes a second condition clause and a second action clause, and wherein the first difference comprises a difference between the first condition clause of the first rule and the second condition clause; and
   in response to a selection of one of the selectable options, change the user-customized IT workflow data of the IT application in a user device according to the model IT workflow data.

2. The non-transitory computer-readable storage medium of claim 1, wherein the display of the first difference and the second difference comprises a first linkage connecting the first rule in the model IT workflow data and the second rule in the user-customized IT workflow data, and a second linkage connecting the third rule in the model IT workflow data and the fourth rule in the user-customized IT workflow data.

3. The non-transitory computer-readable storage medium of claim 1, wherein the display comprises a nested drop down menu of the hierarchical levels of the model IT workflow data and the hierarchical levels of the user-customized IT workflow data.

4. The non-transitory computer-readable storage medium of claim 1, wherein the display comprises a representation of a total number of differences between the model IT workflow data and the user-customized IT workflow data.

5. The non-transitory computer-readable storage medium of claim 1,
wherein the first difference between the first rule and the second rule comprises a first Levenshtein distance between the first rule and the second rule, and
wherein the second difference between the third rule and the fourth rule comprises a second Levenshtein distance between the third rule and the fourth rule.

6. The non-transitory computer-readable storage medium of claim 1, wherein the instructions, when executed by the processor, further cause the processor to:
determine whether the first rule of the model IT workflow data differs as a whole from the second rule of the user-customized IT workflow data; and
determine whether the third rule of the model IT workflow data differs as a whole from the fourth rule of the user-customized IT workflow data.

7. The non-transitory computer-readable storage medium of claim 1, wherein the model IT workflow data of the IT application is provided by an application provider, and the user-customized IT workflow data is a previous version of the model IT workflow data that has been customized in the user device.

8. The non-transitory computer-readable storage medium of claim 1, wherein the instructions, when executed by the processor, further cause the processor to determine that the first rule in the model IT workflow data is in a different location in the model IT workflow data relative to a location of the second rule in the user-customized IT workflow data.

9. The non-transitory computer-readable storage medium of claim 5, wherein the instructions, when executed by the processor, further cause the processor to:
determine whether the first rule matches the second rule based on the first Levenshtein distance; and
determine whether the third rule matches the fourth rule based on the second Levenshtein distance.

10. The non-transitory computer-readable storage medium of claim 1, wherein the first hierarchical level is a top hierarchical level, and the second hierarchical level is a hierarchical level immediately below the top hierarchical level.

11. The non-transitory computer-readable storage medium of claim 1, wherein the first difference between the first rule and the second rule comprises a difference between a first phase or a first transition in the first rule and a second phase or a second transition in the second rule.

12. A method comprising:
receiving a model information technology (IT) workflow data of an IT application and a user-customized IT workflow data of the IT application, wherein each of the model IT workflow data and the user-customized IT workflow data includes rules arranged in hierarchical levels;
determining a first difference between a first rule in a first hierarchical level of the model IT workflow data and a second rule in a first hierarchical level of the user-customized IT workflow data;
after determining the first difference between the first rule and the second rule in the first hierarchical level, determining a second difference between a third rule in a second hierarchical level of the model IT workflow data and a fourth rule in a second hierarchical level of the user-customized IT workflow data; and
generating a display of the first difference and the second difference in a hierarchical format according to the hierarchical levels of the model IT workflow data and the user-customized IT workflow data, wherein the first difference and the second difference are displayed as selectable options, wherein determining the first difference comprises determining a difference between a first segment of a computer language text in the first rule and a second segment of a computer language text in the second rule, and wherein determining the second difference comprises determining a difference between a third segment of a computer language text in the third rule and a fourth segment of a computer language text in the fourth rule.

13. The method of claim 12, wherein the display of the first difference and the second difference further includes a drop down menu of the hierarchical levels of the model IT workflow data and the user-customized IT workflow data.

14. The method of claim 12, wherein the first difference includes a first Levenshtein distance between the first rule and the second rule, and the second difference includes a second Levenshtein distance between the third rule and the fourth rule.

15. A system comprising:
a processor; and
a memory comprising instructions executable by the processor to:
receive a model information technology (IT) workflow data of an IT application and a user-customized IT workflow data of the IT application, wherein each of the model IT workflow data and the user-customized IT workflow data includes rules arranged in hierarchical levels;
determine a first difference between a first rule in a first hierarchical level of the model IT workflow data and a second rule in a first hierarchical level of the user-customized IT workflow by determining a difference between a first segment of a computer language text in the first rule and a second segment of a computer language text in the second rule;
after determining the first difference between the first and second rules in the first hierarchical level, determine a second difference between a third rule in a second hierarchical level of the model IT workflow data and a fourth rule in a second hierarchical level of the user-customized IT workflow data by determining a difference between a third segment of a computer language text in the third rule and a fourth segment of a computer language text in the fourth rule;
generate a display of the first difference and the second difference in a hierarchical format according to the hierarchical levels of the model IT workflow data and the user-customized IT workflow data, wherein the first difference and the second difference are displayed as selectable options; and
in response to a selection of one of the selectable options, change the user-customized IT workflow data of the IT application in a user device according to the model IT workflow data.

16. The system of claim 15, wherein the instructions are further executable by the processor to receive the selection of the selectable options by a user input.

17. The system of claim 15, wherein the first difference comprises a first Levenshtein distance between the first rule and the second rule, and the second difference comprises a second Levenshtein distance between the third rule and the fourth rule.

* * * * *